(12) United States Patent
Petropoulos et al.

(10) Patent No.: US 6,760,068 B2
(45) Date of Patent: Jul. 6, 2004

(54) CORRECTION OF CORRUPTED ELEMENTS IN SENSORS USING ANALOG/MULTI-LEVEL NON-VOLATILE MEMORY

(75) Inventors: Leo Petropoulos, San Jose, CA (US); Sau C. Wong, Hillsborough, CA (US)

(73) Assignee: SanDisk Corporation, Sunnyvale, CA (US)

( * ) Notice: Subject to any disclaimer, the term of this patent is extended or adjusted under 35 U.S.C. 154(b) by 0 days.

(21) Appl. No.: 09/224,168

(22) Filed: Dec. 31, 1998

(65) Prior Publication Data

US 2003/0090580 A1 May 15, 2003

(51) Int. Cl.[7] .................................................. H04N 9/64
(52) U.S. Cl. ....................................... 348/247; 348/251
(58) Field of Search ................................... 348/247, 246, 348/251, 254, 255

(56) References Cited

U.S. PATENT DOCUMENTS

| | | | |
|---|---|---|---|
| 3,719,922 A | | 3/1973 | Lopes, Jr. et al. |
| 3,927,308 A | | 12/1975 | Summers et al. |
| 4,038,685 A | * | 7/1977 | Bazin .......................... 348/675 |
| 4,057,830 A | | 11/1977 | Adcock |
| 4,131,919 A | | 12/1978 | Lloyd et al. |
| 4,420,773 A | | 12/1983 | Toyoda et al. |
| 4,445,189 A | | 4/1984 | Hyatt |
| 4,456,931 A | | 6/1984 | Toyoda et al. |
| 4,602,291 A | * | 7/1986 | Temes ......................... 348/243 |
| 4,614,966 A | | 9/1986 | Yunoki et al. |
| 4,803,554 A | | 2/1989 | Pape |
| 4,875,098 A | * | 10/1989 | Yamamoto et al. .......... 348/250 |
| 4,989,179 A | | 1/1991 | Simko |
| 5,034,804 A | | 7/1991 | Sasaki et al. |
| 5,047,861 A | * | 9/1991 | Houchin et al. ............ 348/247 |
| 5,049,983 A | | 9/1991 | Matsumoto et al. |
| 5,055,930 A | | 10/1991 | Nagasaki et al. |
| 5,155,584 A | | 10/1992 | Taguchi et al. |
| 5,164,915 A | | 11/1992 | Blyth |
| 5,264,944 A | | 11/1993 | Takemura |
| 5,272,535 A | * | 12/1993 | Elabd .......................... 348/314 |
| 5,274,457 A | | 12/1993 | Kobayashi et al. |
| 5,280,358 A | | 1/1994 | Yushiya et al. |
| 5,289,286 A | * | 2/1994 | Nakamura et al. ........ 348/223.1 |
| 5,295,077 A | | 3/1994 | Fukuoka |
| 5,295,485 A | | 3/1994 | Shinomura et al. |
| 5,317,407 A | * | 5/1994 | Michon ....................... 348/306 |
| 5,339,275 A | | 8/1994 | Hyatt |
| 5,519,654 A | | 5/1996 | Kato et al. |
| 5,541,653 A | | 7/1996 | Peters et al. |
| 5,576,757 A | | 11/1996 | Roberts et al. |
| 5,585,846 A | | 12/1996 | Kim |
| 5,606,365 A | | 2/1997 | Maurinus et al. |
| 5,619,445 A | | 4/1997 | Hyatt |

(List continued on next page.)

FOREIGN PATENT DOCUMENTS

| | | | | |
|---|---|---|---|---|
| EP | 0798739 A2 | * | 10/1997 | ........... G11C/11/56 |
| EP | 000798739 A2 | * | 10/1997 | ........... G11C/11/56 |
| JP | 06-036578 | | 2/1994 | |

Primary Examiner—Wendy R. Garber
Assistant Examiner—Jason Whipkey
(74) Attorney, Agent, or Firm—Parsons Hsue & de Runtz LLP

(57) ABSTRACT

A method and system using a sensor array includes a programmable analog/multi-level memory array for modifying individual outputs from elements in the sensor array in order to obtain a desired sensor array output. The memory array can be programmed with data corresponding to desired modifications, such as low and high offset voltage correction, low gain correction, and gamma correction. Consequently, by utilizing arithmetic circuits, the adverse effects of corrupted elements in a sensor can be corrected by re-programming the memory array with different modification data as the need arises.

19 Claims, 5 Drawing Sheets

U.S. PATENT DOCUMENTS

| | | | |
|---|---|---|---|
| 5,644,636 A | 7/1997 | Fernandez | |
| 5,680,341 A | 10/1997 | Wong et al. | |
| 5,687,115 A | 11/1997 | Wong et al. | |
| D389,501 S | 1/1998 | Mascarenas, Sr. et al. | |
| 5,739,850 A * | 4/1998 | Hori | 348/231.99 |
| 5,745,409 A | 4/1998 | Wong et al. | |
| 5,760,727 A | 6/1998 | Lin | |
| 5,777,923 A | 7/1998 | Lee et al. | |
| 5,818,757 A | 10/1998 | So et al. | |
| 5,867,430 A | 2/1999 | Chen et al. | |
| 5,901,086 A | 5/1999 | Wang et al. | |
| 5,910,913 A * | 6/1999 | Kato et al. | 365/185.11 |
| 5,923,585 A * | 7/1999 | Wong et al. | 365/185.03 |
| 5,969,986 A | 10/1999 | Wong et al. | |
| 6,104,437 A * | 8/2000 | Taira et al. | 348/557 |
| 6,134,145 A | 10/2000 | Wong | |
| 6,175,937 B1 | 1/2001 | Norman et al. | |
| 6,177,956 B1 | 1/2001 | Anderson et al. | |
| 6,282,462 B1 * | 8/2001 | Hopkins | 348/314 |
| 6,433,823 B1 * | 8/2002 | Nakamura et al. | 348/254 |
| 6,487,116 B2 * | 11/2002 | Khan et al. | 365/185.11 |
| 2001/0010551 A1 * | 8/2001 | Dierickx | 348/241 |

* cited by examiner

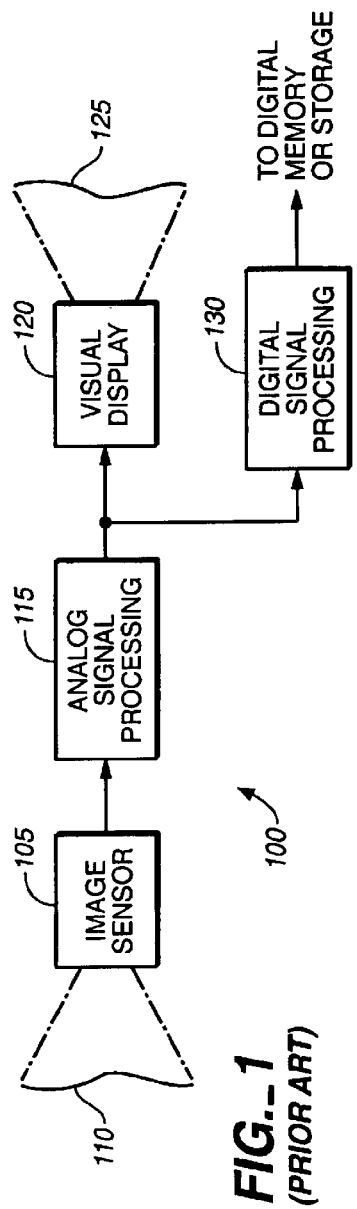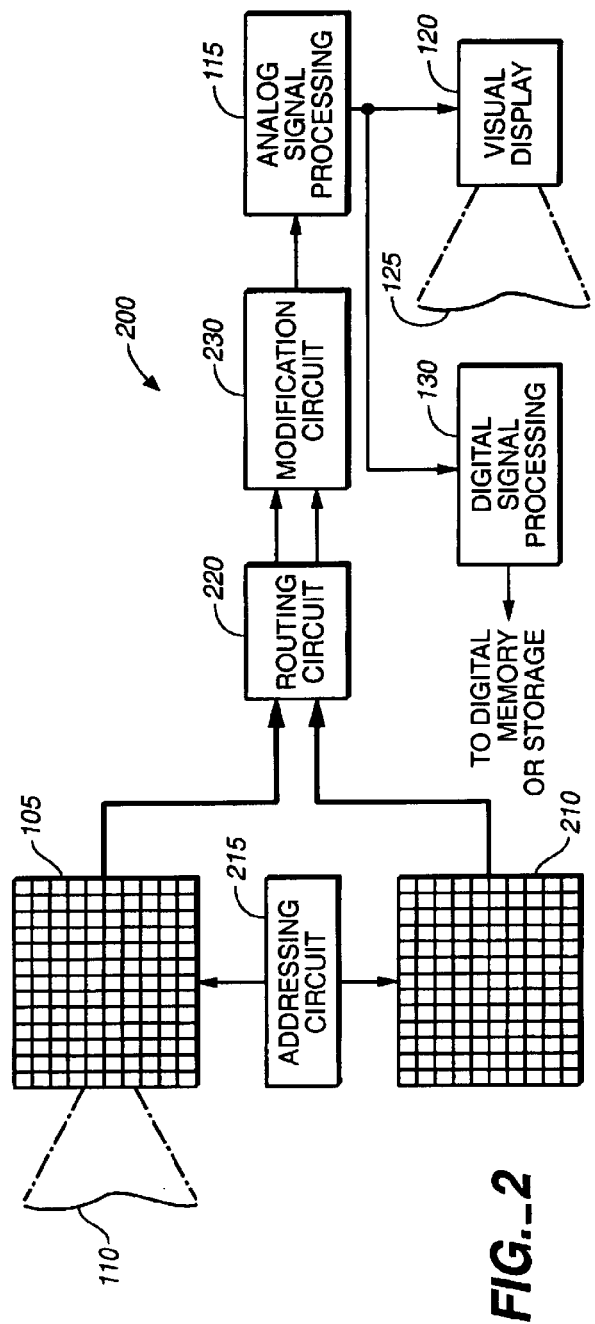

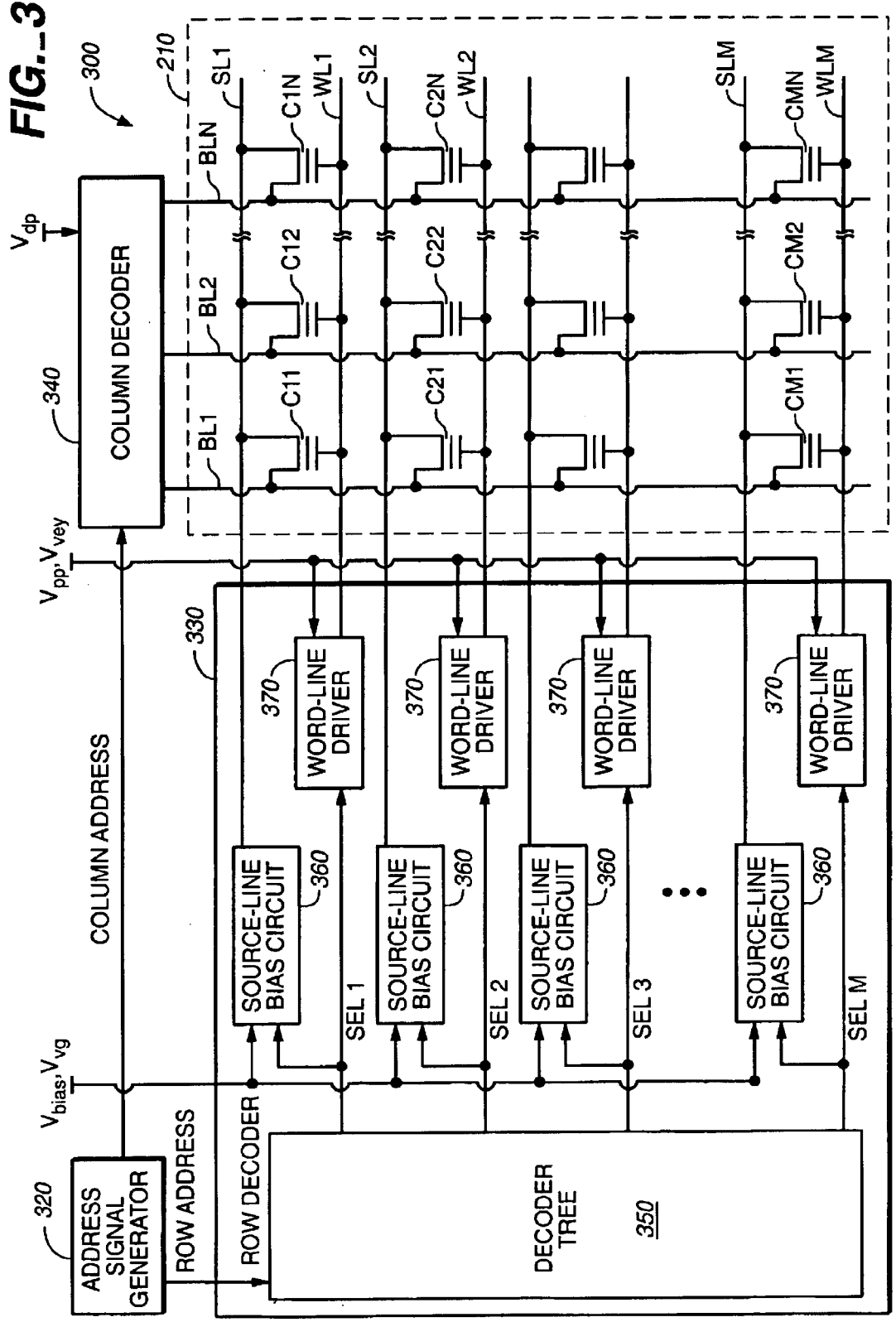

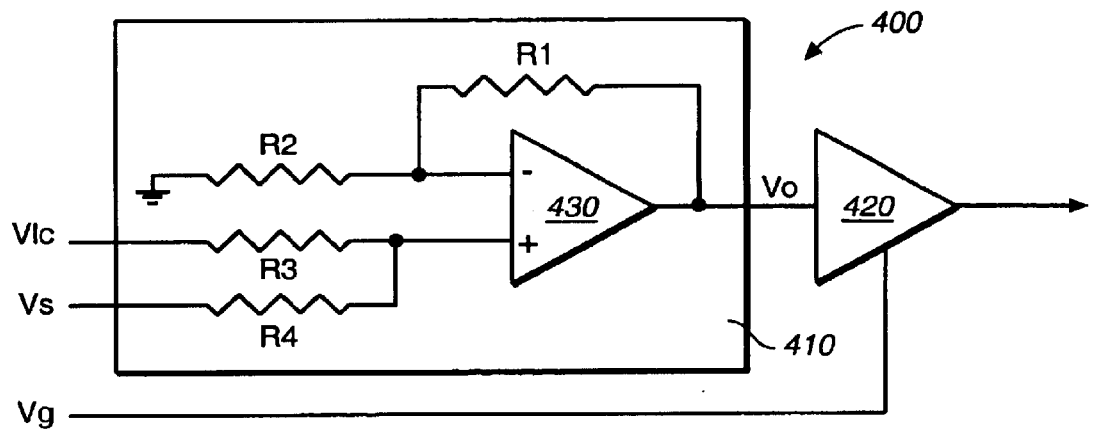
FIG._4
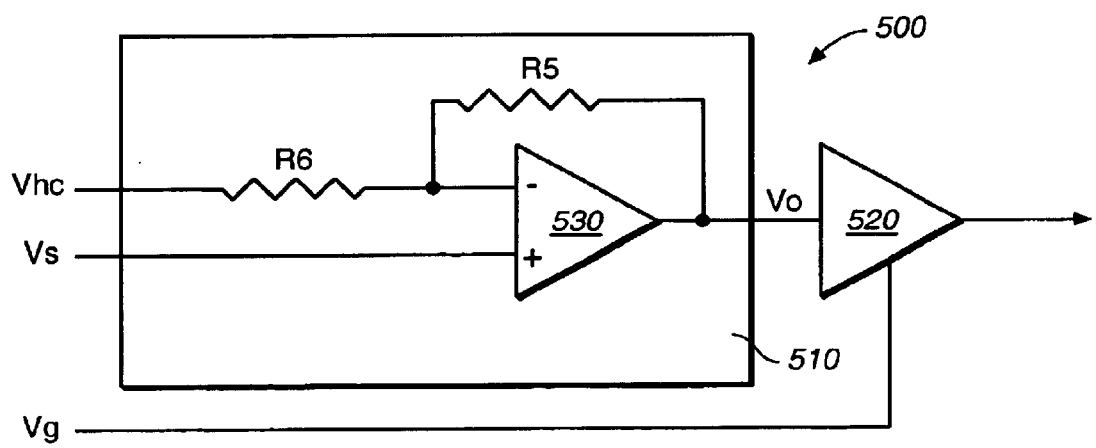
FIG._5

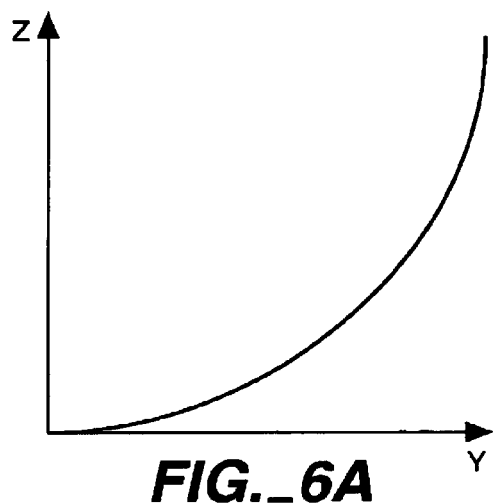
FIG._6A
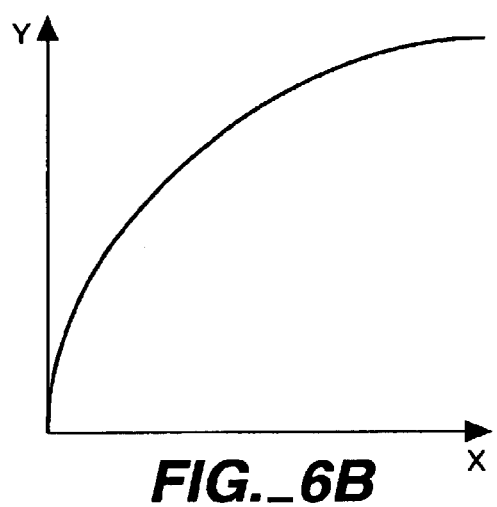
FIG._6B
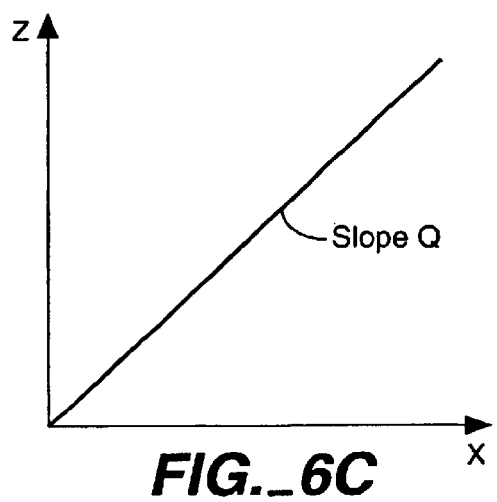
FIG._6C

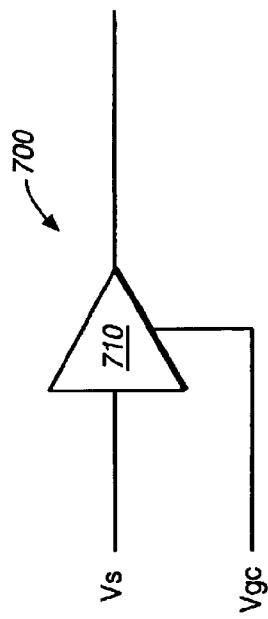
FIG._7
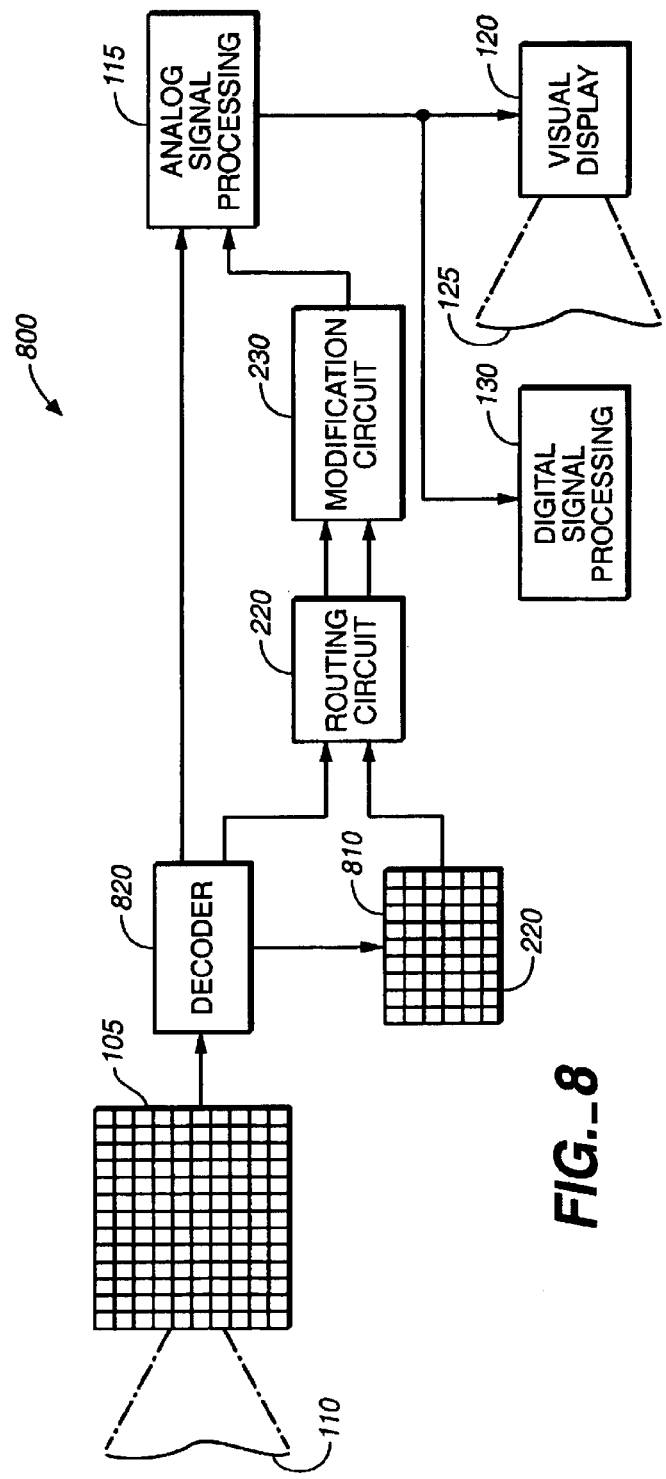
FIG._8

CORRECTION OF CORRUPTED ELEMENTS IN SENSORS USING ANALOG/MULTI-LEVEL NON-VOLATILE MEMORY

BACKGROUND

1. Field of the Invention

This invention relates to signal sensors, and in particular to correcting corrupted elements in such sensors.

2. Description of Related Art

Several types of sensors exist for capturing data of various signals, such as sound or image signals. These sensors typically sample a portion of the signal and translate that sample into a numerical value. The sum of all the translated samples are then processed to recreate the captured data. An example of a two-dimensional sensor is an image sensor, which converts incident light to voltage levels. Generally, the image is divided up into squares in a grid, with each square in the grid referred to as a pixel or sample. The image at each pixel is sampled by the sensor and translated into a numerical value proportional to the light intensity at the pixel. For color images, the light intensity is measured for each of the three primary colors red, green, and blue. Note that as the size of the pixels decrease and the number of pixels increase for the image, the resolution of the image increases.

FIG. 1 is a block diagram of a typical imaging system 100 with an image sensor 105. An image 110 is divided up into an array of pixels, with each pixel being sampled by image sensor 105 and then translated into a numerical value. Image sensor 105 can be, for example, a charge-coupled device (CCD), a CMOS device, a vidicon tube, or any other suitable image sensing device which converts the light falling on it from an image into an electrical signal. For example, if image sensor 105 is based on a CCD (such as in a digital camera), the image sensor comprises a chip having an array of photoelectric elements, such as photodiode cells, with each photodiode cell converting an associated pixel to an electrical signal, such as a voltage. As more light falls onto the photodiode cells, more charge accumulates in the cells. The CCD is constructed such that the photodiode cells, which convert the intensity of light into an electric charge, are arranged in a matrix. The electric charge generated in each sensor element is transferred in vertical and horizontal directions, through the CCD array, to the output. After an integration period, the charge is read out from the cells and processed in a suitable analog signal processing circuit 115.

Analog processing circuit 115 processes the captured image from image sensor 105. The processing circuit 115 can include a correlated double sampling (CDS) circuit, a gain adjust circuit, and an offset adjust circuit (all not shown for simplicity) and can be used to perform various functions such as CDS for reduction of low frequency read-out noise from the image sensor and offset of sense amplifiers, color filter array (CFA) interpolation algorithms for color, gamma correction, white balancing, and automatic gain control (AGC) for optimizing the dynamic range of the signal. The processed image signal can then be used for further processing to display a reconstructed image 125 of the original image 110, such as through a visual display 120, which can be a color LCD or a black and white display. The processed analog image signal can also be transmitted to a digital signal processing circuit 130 for conversion to a digital signal, such as with encoding and compression (e.g., according to JPEG). The resulting digital data can then be used or stored in digital memories, such as memory cards.

However, variances across the image sensor can result in a distorted image on display 120 or in the stored memory. If some of the photodiode cells or elements in the image sensor are damaged or have characteristics different from other cells, the weight of the corresponding pixels can be changed in relation to neighboring pixels. The resulting signal from the image sensor thus contains errors, which manifest themselves after signal processing, as a distorted image on the visual display. Depending on the amount of error and the proximity of other varying sensor elements, adverse effects such as "blooming" and "sparkle" can be introduced to the final image.

Variations in the sensor elements are caused by defects during the manufacturing process of the image sensor, as well as normal variations in the manufacturing process. Thus, it is difficult to build a sensor where every sensing element is uniform and perfect. This problem magnifies as the size of the sensor increases and/or the physical size of the sensor elements decreases. In most applications, the quality of the reproduced image is particularly important, especially in high-end imaging applications.

One way of ensuring that faulty or non-comforming sensors are not used is to maintain very tight quality constraints and test criteria before shipping the sensor to the user. Examples of possible types of constraints and criteria include requiring a certain number of sensor elements to meet or exceed a quality threshold or requiring the variance across a portion or portions of the sensor to be smaller than a maximum acceptable value. If a sensor fails to meet these constraints and criteria, that sensor is rejected as having too many bad or inferior sensor elements. Implementing this method requires complex algorithms to test the sensors, which can significantly increase manufacturing and production time, thereby reducing throughput. Furthermore, a large percentage of sensors may be rejected, which increases the cost per yielded sensor. These problems increase as sensor resolutions increase because the probability of having a bad or inferior cell goes up as the number of sensor elements increases and the size of the individual sensor element decreases. Although preventing bad sensors from being shipped to the user, this method does not address errors with the cells after the sensor is shipped, e.g., cell degradation or damage from prolonged use or exposure.

Another method involves measuring the response from each sensor element and mapping all the responses of the sensing elements that have non-conforming responses. This mapping is then used by the sensor manufacturer to map out the errors in the individual elements prior to shipping. In this manner, a faulty sensor is not automatically rejected, but rather, the faulty elements within the sensor are corrected. However, coordinating the transfer of error data for each and every sensor element is difficult. Some vendors address this by using memory embedded with the sensor, which increases the cost and complexity to the sensor. Furthermore, the sensor element response data cannot be updated after the sensor has been shipped, thereby preventing future corrections of the sensor after shipment.

Therefore, an effective method of correcting corrupted sensor element outputs is desired which overcomes the deficiencies as discussed above.

SUMMARY

In accordance with the invention, modification or correction values are stored in a programmable analog/multi-level non-volatile memory array. These values are used to adjust associated outputs from elements of a sensor array for further processing to achieve a desired output. The modification values can be used for a variety of purposes, such as low or high offset voltage correction (by adding or subtracting, respectively, the corresponding modification value), low gain correction (by multiplying the corresponding modification value), or gamma correction (by multiplying the corresponding gamma correction factor) for visual displays.

The analog/multi-level memory array can be erased and re-programmed when modification values need to be changed, e.g., when elements of the sensor array change, such as through time, exposure to the elements, by physical damage, etc. As a result, the output of a sensor array can be maintained at a desired level of quality even as the individual sensor elements change. Furthermore, because errors introduced into sensor output voltages by faulty or non-uniform sensor elements are corrected prior to signal reconstruction, the eventual reconstructed signal is a truer representation of the original signal.

In some embodiments, the memory cells in the memory array have a one-to-one correspondence with the pixel representations from the sensor array. Thus, each output of the sensor array and the corresponding voltage in the memory cell are supplied to a modification circuit for performing the desired modifications. For example, if the desired modifications include correcting for low offset voltages, high offset voltages, low gain, and gamma correction, the modification circuit can include a summing circuit for adding offset voltages stored in a memory array to sensor output voltages, a subtractor circuit for subtracting offset voltages stored in a memory array from sensor output voltages, and an amplifier circuit for multiplying gain voltages and gamma correction voltages stored in memory arrays with sensor output voltages. These circuits can be included separately in the modification circuit or in various combinations of each other.

In other embodiments, the memory array or arrays are smaller in size than the sensor output array. In these embodiments, a decoder is added to the sensor system for determining whether each sensor element output requires modification. When a sensor element needs modification, the decoder determines the address of the memory cell in the memory array corresponding to the sensor element. This corresponding pair is supplied to the modification circuit for performing the desired modification. Sensor outputs not needing modification bypass the modification circuit.

The present invention will be more fully understood upon consideration of the detailed description below, taken together with the accompanying drawings.

BRIEF DESCRIPTION OF THE DRAWINGS

FIG. 1 is a block diagram of a generalized imaging system;

FIG. 2 is a block diagram of an imaging system according to one embodiment of the present invention;

FIG. 3 is diagram of a memory suitable for use with the system of the present invention;

FIG. 4 is a diagram of a modification circuit for correcting low offset voltages according to one embodiment of the present invention;

FIG. 5 is a diagram of a modification circuit for correcting high offset voltages according to one embodiment of the present invention;

FIGS. 6A, 6B, and 6C are graphs illustrating gamma correction;

FIG. 7 is a diagram of an amplifier for gamma correction; and

FIG. 8 is a block diagram of an imaging system according to another embodiment of the present invention.

Use of the same reference symbols in different figures indicates similar or identical items.

DETAILED DESCRIPTION OF THE PREFERRED EMBODIMENTS

In accordance with the present invention, a method and structure are provided which uses modification or correction values (i.e., voltages) stored in an analog/multi-level memory array to modify the output of a sensor array to obtain a desired result. The memory array can be re-programmed with different modification values for different uses or when elements of the sensor array change. For example, for correcting corrupted elements in a sensor, the memory array can be programmed with appropriate offset voltages to be subtracted or added to the sensor element output or programmed with appropriate gains to be multiplied to sensor elements with low gain. Also, the memory array can be programmed with gamma correction values for gamma correction of visual displays, thereby eliminating the need for a separate gamma correction circuit.

FIG. 2 is a generalized block diagram according to one embodiment of the present invention. One type of sensor, an image sensor 105, is used with an imaging system 200. Image sensor 105 samples an image 110, which has been divided up into an array of pixels. Each cell or sensor element of image sensor 105 samples a corresponding pixel of the image and converts the pixel to a representative voltage. As a result, the image 110 is converted into an array of voltages, as is well known in the art. Pairs of desired corresponding voltages from the array of voltages from image sensor 105 and from the array of voltages stored in an analog/multi-level memory 210 are accessed and read out by an addressing circuit 215. The desired pair or pairs of voltages are then input into a routing circuit 220. Depending on the type of modification, routing circuit 220 routes the two respective voltages from the image sensor and the memory array to the specific circuit (discussed in detail below) in a modification circuitry block 230 for performing the desired modification to the image sensor voltage. Voltages from image sensor elements not requiring modification, i.e., from non-faulty sensor elements, are also input to modification circuitry block 230, but pass through essentially unchanged. Different types of modification include, but are not limited to, adding or subtracting an offset voltage, multiplying a gain voltage, and multiplying a gamma correction voltage.

The modified and any unmodified sensor voltages are supplied to an analog signal processing circuit 115 for processing and eventual display of the reconstructed image 125, such as through a visual display 120. The analog signal from circuit 115 can also be transmitted to a digital signal processing circuit 130, for example, to perform JPEG encoding and compression. The resulting digital signal can then be routed for display, further processing, or storage in a digital memory device, such as an external memory card. Because errors introduced into the image sensor voltages by faulty or non-uniform sensor elements are corrected prior to image reconstruction, the eventual reconstructed image is a truer representation of the original image 110.

The voltages for modifying the sensor element voltages can be programmed and stored in any suitable analog/multi-level memory array 210, such as those described in commonly-owned U.S. Pat. Nos. 5,694,356, entitled "HIGH RESOLUTION ANALOG STORAGE EPROM AND FLASH EPROM" to Wong et al., U.S. Pat. No. 5,680,341, entitled "PIPELINED RECORD AND PLAYBACK FOR ANALOG NON-VOLATILE MEMORY" to Wong et al., and U.S. Pat. No. 5,818,757, entitled "ANALOG AND MULTI-LEVEL MEMORY WITH REDUCED PROGRAM DISTURB" to So et al., and in commonly-owned U.S. patent application Ser. No. 09/159,397, entitled "ANALOG BUFFER MEMORY FOR HIGH SPEED DIGITAL IMAGE CAPTURE" to Wong et al., U.S. Pat. No. 6,594,036, entitled "ANALOG MULTI-LEVEL MEMORY FOR DIGITAL IMAGING" to Wong et al., U.S. Pat. No. 5,923,585, entitled "SOURCE BIASING IN NON-VOLATILE MEMORY HAVING ROW-BASED SECTORS" to Wong et al. and U.S. Pat. No. 5,896,340, entitled "MULTIPLE ARRAY ARCHITECTURE FOR ANALOG OR MULTI-LEVEL MEMORY" to Wong et al., all of which are incorporated by reference in their entirety.

FIG. 3 illustrates a programmable and erasable non-volatile memory 300 with a memory array 210 that can be used in the present invention. Memory array 210 has M rows and N columns of memory cells C11 to CMN. In memory array 210, each memory cell C11 to CMN is a single n-channel floating gate transistor, but other types of memory cells such as split-gate or two-transistor memory cells can also be used. Each memory cell C11 to CMN has a control gate coupled to one of word-lines WL1 to WLM, a drain coupled to one of bit-lines BL1 to BLN, and a source coupled to one of source-lines SL1 to SLM.

When writing a data value, an address signal generator 320 provides address signals indicating a row address and a column address for a selected one of memory cells C11 to CMN to which the data value will be written. The row address identifies the row containing the selected memory cell and a word-line and a source-line coupled to the selected memory cell. The column address identifies the column containing the selected memory cell and a bit-line coupled to the selected memory cell. Address signal generator 320 can be a buffer circuit that generates the address signals from addresses provided by circuitry external to memory 300, or address signal generator 320 can generate sequential addresses for recording analog or multi-level samples of a continuous analog signal.

For an analog/multi-level non-volatile memory, writing a data value to the selected memory cells changes the threshold voltage of the selected memory cell from an erased state to a state indicating the data value being stored. The direction of the change is constant and referred to herein as the programming direction. Programming voltages are applied to the word-line, bit-line, and source-line coupled to the selected memory cell to cause the change in the threshold voltage. For example, to write an analog value to memory cell C11, a row decoder 330 grounds source-line SL1 to a virtual-ground voltage Vvg, which is close to a reference potential Vss and applies a programming voltage Vpp to word-line WL1; and a column decoder 340 applies programming voltage Vdp to bit-line BL1. The magnitudes of the programming voltages Vpp and Vdp depend on structure of memory cells C11 and CMN and may depend on the analog value being written. If memory array 210 is a Flash memory array, typical programming voltages Vpp and Vdp are respectively about 12 volts and about 6 volts above voltage Vss, and the combination of programming voltages causes channel hot electron (CHE) injection that increases the threshold voltage of the selected memory cell.

Column decoder 340 applies programming voltage Vdp to the selected bit-line and disconnects unselected bit-lines. Column decoder 340 can be implemented using designs that are well known in the art.

Row decoder 330 contains a decoder tree 350, source-line bias circuits 360, and word-line drivers 370. Decoder tree 350 generates select signals SEL1 to SELM, each of which corresponds to a row in memory array 210 and indicates whether the corresponding row contains the selected memory cell. Word-line drivers 370 and source-line bias circuits 360 use signals SEL1 and SELM when determining the voltage to be applied to word-lines WL1 to WLM and source-lines SL1 to SLM.

Word-line drivers 370 apply programming and verify voltages Vpp and Vvfy, respectively, to the word-line selected by decoder tree 350 during a write/verify cycle. In alternative embodiments, word-line drivers 370 either ground unselected word-lines or bias some or all of the unselected word-lines at a bias voltage to reduce program disturb. U.S. Pat. No. 5,818,757, entitled "ANALOG AND MULTI-LEVEL MEMORY WITH REDUCED PROGRAM DISTURB", referenced above, describes word-line drivers that bias word-lines coupled to unselected memory cells that contain data and ground word-lines coupled to unselected memory cells that are erased.

Source-line bias circuits 360 control the voltages on source-lines SL1 to SLM. source-lines SL1 to SLM are electrically isolated from each other, so that each row of memory array 210 constitutes a sector having an independently controllable source voltage. In memory array 210, each sector (or row) can be erased independently of the other sectors when a different type of modification is to be performed on portions of image sensor outputs. Once erased, new modification data can be written to desired memory cells.

During a write to a selected memory cell, the source-line coupled to the selected memory cell is connected to Vss or ground, the source-lines coupled to unselected memory cells are raised to a bias voltage Vbias, the word-line coupled to the selected memory cell is alternating between programming voltage Vpp and verify voltage Vvfy, and the bit-line coupled to the selected memory cell is raised to programming voltage Vdp. Accordingly, desired data or voltages can be programmed and stored in memory array 210 using closed-loop program and verify schemes as described in references incorporated above.

If analog/multi-level memory array 210 is used to correct for low offset voltage in the image sensor cells, then offset voltages are programmed and stored in memory array 210. These offset voltages are added to corresponding low offset voltages from the image sensor. A low offset voltage results in a darker, but accurate, representation of the sampled pixel. Thus, a black level adjustment can be made to the sensor elements with low offset voltage by adding an appropriate offset voltage. The offset voltages to be programmed and stored in memory array 210 can be obtained by exposing all the elements in the image sensor to a light of uniform intensity. For example, the amount of intensity can be of the same order of magnitude as a typical image to be sampled. After image sensor 105 samples the image (the light), each of the sensor elements translates its corresponding pixel to a voltage. Each of these voltages is subtracted from a reference voltage representing the voltage for a perfect sensor element. The resulting array of offset voltages is programmed and stored in memory array 210, which correspond to an individual offset correction voltage for each sensor element. If all the sensor elements are perfect and uniform, the voltages in all the cells in the memory array will be essentially the same magnitude, and the array of offset voltages will be approximately zero. However, if some or all of the sensor elements suffer from a low offset voltage, the corresponding offset voltages in memory array 210 are added to the sensor element read-out voltages to correct the low offset voltage.

FIG. 4 shows a circuit 400, which can be used in modification circuitry block 230, for correcting low offset voltages. Other types of summing circuits can also be used. Circuit 400 includes a summing circuit 410 and an amplifier 420. Summing circuit 410 comprises an operational amplifier (op amp) 430 with four resistors R1 to R4. Resistor R1 is coupled between the inverting input terminal and the output of op amp 430, resistor R2 is coupled between ground and the inverting input terminal of op amp 430, resistor R3 is coupled between the sensor element voltage Vs that routing circuit 220 selected from image sensor 105 and the non-inverting input terminal of op amp 430, and resistor R4 is coupled between the low offset correction voltage Vlc that routing circuit 220 selected from memory array 210 and the non-inverting input terminal of op amp 430. If the resistances of R1 and R2 are equal and the resistances of R3 and R4 are equal, the output Vo of op amp 430 will be the unweighted sum of Vs and Vlc, i.e., Vo=Vs+Vlc.

Other modifications can be made to the sensor element voltages by transmitting different correction voltages from other similar analog/multi-level memory arrays. In FIG. 4, by including amplifier 420, circuit 400 can also make adjustments for gain. The output Vo of summing circuit 410 is coupled to the input of amplifier 420, where the gain of amplifier 420 is determined by the associated voltage Vg from voltages stored in a gain correction analog/multi-level memory array, which is similar to analog/multi-level memory array 210. Gain correction values can be stored in the gain correction memory array using a variety of methods. For example, for an image sensor, a light source can be used to illuminate the sensor. The light source is then linearly ramped from a low intensity to a high intensity, and the individual sensor outputs measured at various times during the ramping. For a uniform and ideal sensor, the output voltages would follow a linear relationship, y=ax+b, where y is the output voltage, x is the input voltage, a is the gain, and b is the offset voltage. By measuring the individual output voltages y and comparing y to the expected value, without the offset, gain correction voltages can be stored in the memory array such that all the sensor elements are corrected to a gain of a. Thus, amplifier 420 can provide a gain less than one, a unity gain, or a gain greater than one to voltage Vo for adjusting the gain of individual sensor elements.

Another analog/multi-level memory array can be used to also correct for high offset voltages in the sensor elements. In this case, offset voltages stored in a high offset correction memory array are subtracted from corresponding sensor element voltages from image sensor 105. The offset voltages are determined in a similar way as described above for correction of low offset voltages, except that the image sensor voltages are subtracted from the reference voltage. FIG. 5 shows a circuit 500, which can also be used in modification block 230, for correcting high offset voltages. Similarly, other types of subtractor circuits are suitable for this invention as well. Circuit 500 includes a subtractor circuit 510 and an amplifier 520. Subtractor circuit 510 subtracts a high offset correction voltage Vhc from the corresponding image sensor voltage Vs. Voltage Vs is supplied to the non-inverting input terminal of an op amp 530. Voltage Vhc is supplied to the inverting input terminal of op amp 530 through a resistor R5, with a resistor R6 coupled between the inverting input terminal and the output Vo of op amp 530. If the resistances of resistors R5 and R6 are equal, then the output voltage Vo is equal to Vs-Vhc. A separate gain correction memory array and amplifier 520 can be included so that gain correction can be made after the high offset voltage correction, similar to the description above.

In addition to correction of high and low offset voltages and gain, an analog/multi-level memory can be used to correct for other factors that can distort a reconstructed image, such as non-linearities in television cameras and monitors or blurry displays of very dark or very light images using gamma correction. Non-linearities are caused when signals are displayed by visual display 120 utilizing a cathode rate tube (CRT) display since CRTs have a non-linear input/output characteristic, as shown in FIG. 6A. The relationship between an input signal voltage (y) to the CRT display and light output (z) from the CRT display can be defined as follows:

$$z=K*y^\gamma \qquad (1)$$

where z is the light output of the CRT, K is a constant, y is the input signal to the CRT, and γ (gamma) is a constant, typically ranging between 2.2 and 2.5.

Thus, as seen from equation (1) and FIG. 6A, the light output (z) is compressed for low intensity input voltages (y) and expanded for high intensity input voltages (y). As a result, the displayed image on the CRT display is distorted. In order to compensate for this non-linearity of the CRT, an inverse relationship to equation (1) is applied to the input signal (y) before being supplied to the CRT display, known as gamma correction. The gamma correction equation is as follows:

$$y=C*x^{1/\gamma} \qquad (2)$$

where y is the output of gamma correction and the input to the visual display, C is a constant, x is the input to the gamma correction, and 1/γ is the gamma correction factor. Equation (2) is plotted in FIG. 6B.

The combined effect of gamma correction (2) and CRT non-linearity (1) results in a linear output (z), as shown by combining equations (1) and (2) to obtain equation (3), as follows:

$$z=K*y^\gamma=K*(C*x^{1/\gamma})^\gamma=K*C^\gamma*x=Q*x \qquad (3)$$

where Q is a constant.

Thus, by choosing appropriate values for constants K and C, a linear output z from the visual display 120 can be obtained with a gain Q, as shown in FIG. 6C.

Referring back to FIG. 1, the gamma correction can be performed in analog signal processing circuit 115. However, gamma correction circuitry can be large and complex, with multiple log and anti-log amplifiers, variable gain amplifiers implemented with arrays of precisely matched diodes or with programmable read only memories (PROMs) which have the log and anti-log characteristics stored for look up.

FIG. 7 shows a circuit 700, which can be used in modification block 230, for gamma correction using stored values in an analog/multi-level memory array. Circuit 700 includes an op amp 710, which multiplies the input voltage Vs from individual sensor elements in the image sensor by a corresponding gamma correction factor Vgc stored in the gamma correction memory array. As a result, image sensor elements can be gamma-corrected to produce a linear output from visual display 120 without the need of a separate gamma correction circuit.

By using a plurality of memory arrays 210, each being programmed and stored with voltages for a different modification function, a variety of modifications to the sensor element voltages can be performed. In such a system, a desired one of the memory arrays 210 is selected for a particular modification. The image sensor voltages to be modified and the corresponding voltages in the memory array 210 are read and supplied to the appropriate modification circuit, e.g., such as shown in FIGS. 4, 5, and 7 above, to perform the desired modifications.

In the above embodiments, it was assumed that the size of memory array 210 is the same as that of the image sensor array for a one-to-one correspondence between the memory cells of the array and the pixel voltages in the sensor array, and each associated pair of voltages is supplied to routing circuit 220. However, in many situations, only a few of the image sensor elements may be faulty and in need of correction. In these cases, a smaller sized memory array 810 can be used with a decoder 820, as shown in imaging system 800 of FIG. 8. Memory array 810 is similar to memory array 210 described above, except with less rows and/or columns of memory cells. Voltages from elements of image sensor 105 are input to decoder 820, which decides whether the voltage requires modification, e.g., from a faulty sensor element or for gamma correction. If the voltage requires modification, then decoder 820 accesses the address location of the appropriate memory cell in memory array 810. The voltage from the cell is read and transferred, along with the corresponding voltage from the image sensor element, to routing circuit 220 for modification by the appropriate circuit in modification block 230. Voltages from image sensor elements not requiring modification are passed directly from decoder 820 to analog signal processing circuit 115. The analog signal can then be displayed or transmitted for digital signal processing, as described above.

In other embodiments, a single analog/multi-level memory array can be used in conjunction with a decoder for multiple types of modifications. The memory array is programmed with data corresponding to the desired types of modifications in various portions of the array. The decoder then determines the type of modification for a particular voltage from an image sensor element and accesses the desired voltage from the memory array. Both voltages are then supplied to the appropriate modification circuit.

Because the memory arrays discussed above can be reprogrammed, various types of sensor modifications are possible. Further, as the sensor array changes its response and/or uniformity over time (e.g., due to use degradation, physical damage, etc.), the memory array can be reprogrammed to compensate for the new errors. As a result, the memory array for a sensor can be continually updated in order to maintain the desired output of the sensor.

Although the invention has been described with reference to particular embodiments, the description is only an example of the invention's application and should not be taken as a limitation. For example, the present invention can be applied to any type of one-, two-, or three-dimensional sensor which has individual sensor elements for modification of the sensor element output. Various adaptations and combinations of features of the embodiments disclosed are within the scope of the invention as defined by the following claims.

We claim:

1. A method of processing sensor element outputs in a sensor array, comprising:
   storing voltages corresponding to a desired modification in a programmable analog/multi-level memory array; and
   modifying the sensor element outputs with associated ones of the voltages stored in the memory array, wherein said sensor element outputs are multiplied with gamma correction values, wherein the memory array and the sensor array are the same size.

2. The method of claim 1, further comprising bypassing the modifying for sensor element outputs not needing modification.

3. A method of processing sensor element outputs in a sensor array, comprising:
   storing voltages corresponding to a desired modification in a programmable analog/multi-level memory array, wherein each of said voltages is associated with a single one of said sensor elements; and
   modifying the sensor element outputs with associated ones of the voltages stored in the memory array, wherein the memory array is smaller than the sensor array.

4. The method of claim 3, further comprising transferring corresponding pairs of sensor element outputs and the voltages stored in the memory array to a modification circuit after said storing.

5. The method of claim 3, further comprising processing said modified sensor element outputs after said modifying.

6. The method of claim 3, wherein said sensor array is an image sensor array.

7. The method of claim 3, wherein said modifying comprises adding one of the voltages stored in the memory array to a corresponding sensor element output, subtracting one of the voltages stored in the memory array from a corresponding sensor element output, or multiplying one of the voltages stored in the memory array with a corresponding sensor element output.

8. A method of modifying elements in a sensor array, comprising:
   programming modification voltages in memory cells of an analog/multi-level memory array, wherein the memory array is smaller than the sensor array and wherein each of said modification voltages corresponds with a single one of said sensor elements;
   reading the modification voltage in the memory cell corresponding to a first voltage from an element in the sensor array requiring modification;
   supplying the modification voltage and the first voltage to a modification circuit; and
   modifying the first voltage with the modification voltage, wherein the modification voltages are determined by:
      exposing sensor elements in a sensor with a known signal;
      measuring the voltages from the sensor elements;
      comparing the measured voltages with voltages desired from exposing the sensor elements with the known signal; and
      performing an arithmetic operation to obtain a modification voltage, wherein the modification voltage modifies a corresponding measured voltage to obtain a desired sensor element voltage.

9. A signal processing system comprising:
   a sensor, wherein the sensor outputs voltages forming an array of elements;
   an analog/multi-level memory array having memory cells corresponding to the array of elements;
   a modification circuit coupled to the sensor and the memory array, wherein the modification circuit modifies voltages of the array of elements with corresponding voltages of the memory cells, wherein the memory array is smaller than the array of elements; and a decoder circuit coupled to the memory array and the array of elements for determining the memory cell in the memory array corresponding to the voltage from the array of elements requiring modification.

10. The system of claim 9, wherein the sensor is an image sensor.

11. The system of claim 9, further comprising a signal processing circuit coupled to the modification circuit for processing modified voltages.

12. The system of claim 9, wherein the modification circuit comprises a summing circuit.

13. The system of claim 12, wherein the modification circuit further comprises a subtractor circuit.

14. The system of claim 13, wherein the modification circuit further comprises a multiplier circuit.

15. A signal processing, comprising:

a sensor, wherein the sensor outputs voltages forming an array of elements;

an analog/multi-level memory array having memory cells corresponding to the array of elements; and a modification circuit coupled to the sensor and the memory array, wherein the modification circuit modifies voltages of the array of elements with corresponding voltages of the memory cells, wherein the modification circuit performs gamma correction, wherein the memory array and the array of elements are the same size.

16. A sensor correction system, comprising:

a sensor array having a first plurality of memory cells for storing sensor voltages corresponding to the outputs of the sensor array;

a programmable analog/multi-level memory array having a second plurality of memory cells each comprising a source, a drain and a control gate for storing modification voltages corresponding to desired modifications of the sensor voltages, wherein the second plurality of memory cells is smaller than the first plurality of memory cells, wherein each of said modification voltages corresponds with a single one of said sensor elements, and wherein the second plurality of memory cells is arranged in rows and columns in the array;

a column decoder having bit-lines coupling the drains of memory cells in each column of the array;

a row decoder having word-lines coupling the control gates of memory cells in each row of the array and source-lines coupling the sources of memory cells in each row of the array;

a routing circuit coupled to the sensor array and to the programmable analog/multi-level memory array for selecting a first voltage from the sensor array for modification and a corresponding second voltage from the analog/multi-level memory array; and a modification circuit for modifying the first voltage with the second voltage, wherein the first plurality of memory cells is larger in number than the second plurality of memory cells.

17. The system of claim 16, further comprising an analog signal processing circuit coupled to the modification circuit and a visual display device coupled to the analog signal processing circuit.

18. The system of claim 17, further comprising a digital signal processing circuit coupled to the analog signal processing circuit.

19. The system of claim 18, wherein the digital signal processing circuit performs encoding and compression of the signal from the analog signal processing circuit.

* * * * *